US008336782B2

(12) United States Patent
Clegg

(10) Patent No.: US 8,336,782 B2
(45) Date of Patent: Dec. 25, 2012

(54) COMBINATION STORED VALUE CARD HOLDER

(76) Inventor: Timothy Clegg, Manhattan Beach, CA (US)

( * ) Notice: Subject to any disclaimer, the term of this patent is extended or adjusted under 35 U.S.C. 154(b) by 83 days.

(21) Appl. No.: 13/070,760

(22) Filed: Mar. 24, 2011

(65) Prior Publication Data

US 2012/0241520 A1 Sep. 27, 2012

(51) Int. Cl.
*G06K 19/00* (2006.01)

(52) U.S. Cl. .......... 235/487; 229/102; 40/259.5; 53/412

(58) Field of Classification Search .................. 229/102; 40/124.03, 259.5, 460; 206/459.5, 460; 53/412, 53/416, 492; 235/487
See application file for complete search history.

(56) References Cited

U.S. PATENT DOCUMENTS

2008/0237317 A1* 10/2008 Rosendall .................... 229/102

* cited by examiner

*Primary Examiner* — Karl D Frech
(74) *Attorney, Agent, or Firm* — Clement Cheng

(57) ABSTRACT

A combination stored value card holder has a card backer having a planar shape. A primary stored value card container includes a sealed package having a front sheet and a rear sheet. The front sheet is laminated to the rear sheet. A stored value card is retained between the front sheet and the rear sheet of the sealed package. The sealed package is attached to the backer. A secondary stored value card container for the stored value card can be included and the secondary stored value card container can be attached to the backer. An account identifier is disposed on the stored value card. A card window is formed on the rear sheet of the sealed package, and the card window opening exposes the account identifier.

18 Claims, 5 Drawing Sheets

COMBINATION STORED VALUE CARD HOLDER

FIELD OF THE INVENTION

The present invention is in the field of stored value card holders.

DISCUSSION OF RELATED ART

Instead of cash or a consumer product gift, gift cards are commonly given to friends and family. Instead of a card by itself, gift cards can be placed in a holder. A wide variety of different holder designs have been created for the purpose of making a gift card appear to be more thoughtful and attractive. A stored value card may be a gift card, a debit card, or any other variety of card having a linkage to a financial account. A wide variety of different types of stored value card holders have been discussed in the prior art.

A variety of different gift card holders have been created in order to provide a more appealing method of delivering a stored value card. For example, in U.S. Pat. No. D532,452 to Heng, issued Nov. 21, 2006 the disclosure of which is incorporated herein by reference, a card holder comprises an ornamental slot in which to slide the gift card. A device comprising a folding gift card with a slot is shown in U.S. Pat. No. 6,732,459 to Clark, issued May 11, 2004 the disclosure of which is incorporated herein by reference.

For example, in U.S. Pat. No. 5,004,271 to Piatt, issued Apr. 2, 1991 the disclosure of which is incorporated herein by reference, the greeting card device comprises two folding panel sleeves that slide together. A device which comprises a pull-out pocket in which to store a compact disc is shown in U.S. Pat. No. 5,971,157 to Howell, issued Oct. 26, 1999 the disclosure of which is incorporated herein by reference.

A slide out card configuration comprises a presentation section which slides outward to reveal a packaged card, as shown in U.S. Pat. No. 7,503,482 to Wilen, issued Mar. 17, 2009 the disclosure of which is incorporated herein by reference. For example, in U.S. patent application Ser. No. 11/582,226 to Geitner, issued May 1, 2008, the disclosure of which is incorporated herein by reference, an ornamental gift card holder comprises a slot with open and closed ends to retain a gift card. Also for example, in U.S. Pat. No. 4,949,482 to Price, issued Aug. 21, 1990, the disclosure of which is incorporated herein by reference, a folded card device comprises a three dimensional structure for displaying information.

Also, a variety of different gift card holders have been created in order to provide a more appealing method of delivering a stored value card. For example, in U.S. Pat. No. 7,275,683, issued Oct. 1, 2007 the disclosure of which is incorporated herein by reference, a card holder assembly package comprises an enclosed container, a backing, a greeting card and/or a financial transaction card. A device comprising a financial transaction card assembly with a packaged product is shown in U.S. Pat. No. 7,810,711 to Clegg et al., issued Oct. 12, 2010 the disclosure of which is incorporated herein by reference.

For example, in U.S. Pat. No. 7,717,347 to Clegg et al., issued May 18, 2010 the disclosure of which is incorporated herein by reference, the greeting card device comprises a pop-up member and slot for a financial transaction card. A device which comprises a sealed gift-card holder with a portion of the package revealing the magnetic barcode is shown in U.S. patent application Ser. No. 12/140,443 to Payne, issued Nov. 12, 2009 the disclosure of which is incorporated herein by reference.

SUMMARY OF THE INVENTION

A combination stored value card holder has a card backer having a planar shape. A primary stored value card container includes a sealed package having a front sheet and a rear sheet. The front sheet is laminated to the rear sheet. A stored value card is retained between the front sheet and the rear sheet of the sealed package. The sealed package is attached to the backer. A secondary stored value card container for the stored value card can be included and the secondary stored value card container can be attached to the backer. An account identifier is disposed on the stored value card. A card window is formed on the rear sheet of the sealed package, and the card window opening exposes the account identifier.

Account purchase information is printed on a sealed package back side. A card backer opening is formed on the card backer, and the card backer opening exposes the account identifier. A secondary stored value card container can hold the stored value card, or a greeting card can hold the stored value card retainer. The secondary stored value card container is a card storage case. A pair of loops, namely and left loop and a right loop, and the left loop and the right loop retain the secondary stored value card container to the card backer.

Figure 1:
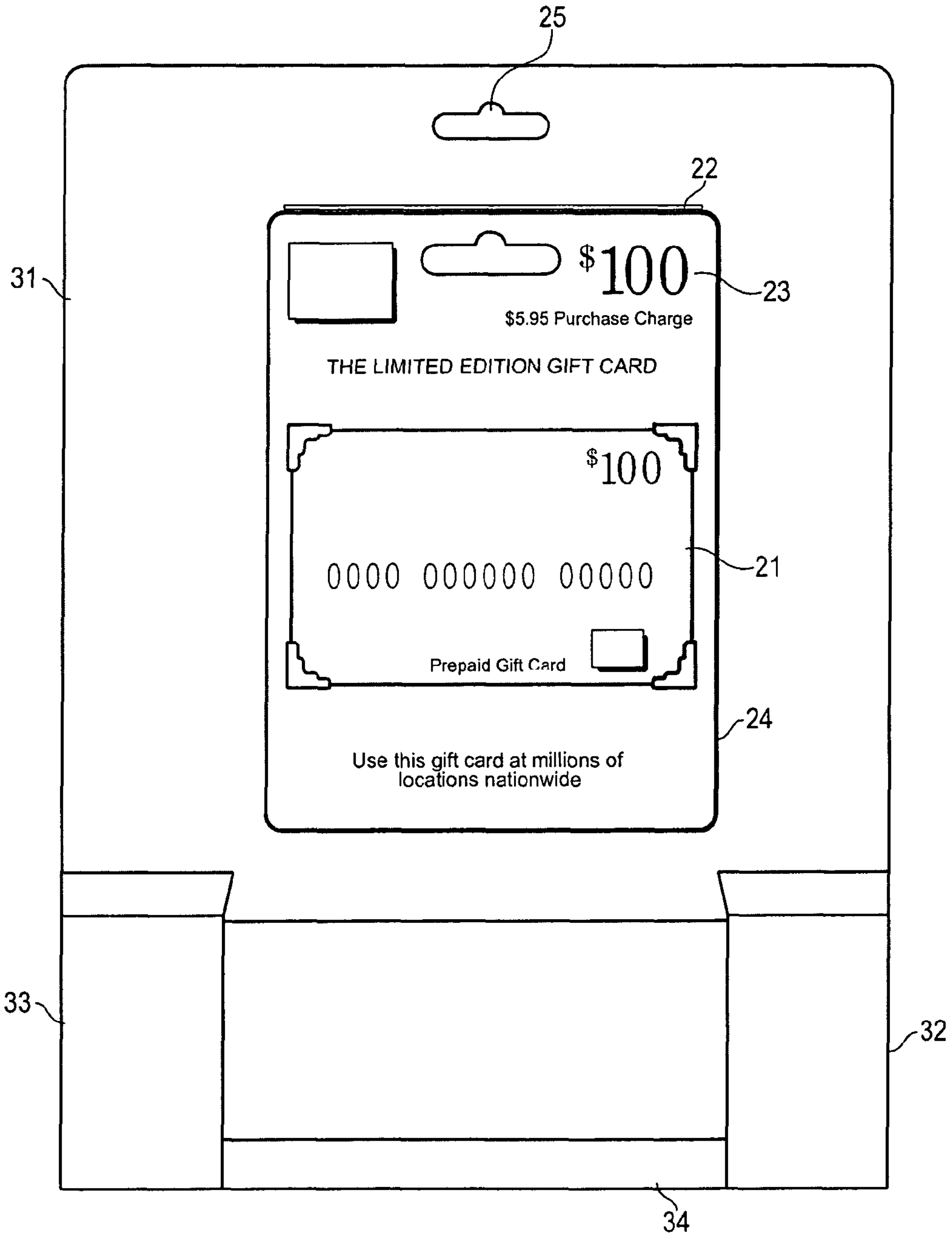
FIG. 1 is a front view of the present invention.

The following call out list of elements can be useful in referencing the elements of the drawings.

21 Card Graphic
22 Hinge Attachment
23 Amount Indicator
24 Sealed Package
25 Hang Slot
27 Sealed Package Backside
28 Sealed Package Front Sheet
29 Sealed Package Rear Sheet
31 Card Backer
32 Right Loop
33 Left Loop
34 Cardholder Case
35 Greeting Card
36 Greeting Card Envelope
41 Card Window
42 Account Identifier
43 Account Purchase Information
44 Account Terms and Conditions
88 Stored Value Card
89 Stored Value Card Retainer

DETAILED DESCRIPTION OF THE PREFERRED EMBODIMENT

The present embodiment has a sealed package 24 which holds a stored value card 88. The sealed package 24 has an opening window 41 on a sealed package backside 27. The card window 41 allows viewing of an account identifier 42 preferably imprinted on the stored value card 88. The card window 41 is large enough to allow viewing of the account identifier 42, but not large enough to remove the card 88 from the sealed package 24. The sealed package is formed of a sealed package front sheet 28 having lamination to a sealed package rear sheet 29 along and external periphery of the sealed package.

Figure 5:
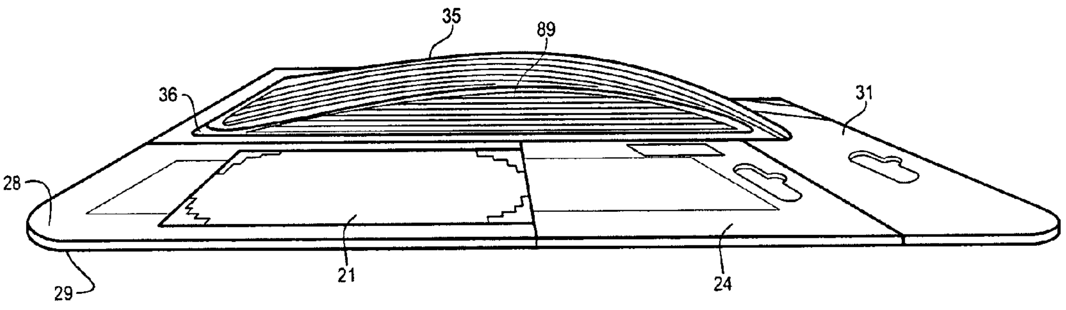
FIG. 5 is a perspective side view of the present invention.

The sealed package has a first stored value card cavity for storing the stored value card and a second stored value card container used for presentation can have a stored value card retainer 89 for storing the stored value card. The stored value card retainer 89 can be a cavity for storing the stored value card after a user purchases and decides to transfer the stored value card from the sealed package to the stored value card retainer 89 of the second stored value card container. As seen in FIG. 5, the stored value card can be placed between a front greeting card sheet and a rear greeting card sheet of a folding greeting card having a front greeting card sheet folding relative to a rear greeting card sheet at a top edge.

The card backer 31, FIG. 1 provides a frame to allow hanging of a sealed package 24 on to the card backer 31. The sealed package 24 may have a hinge attachment 22 an amount indicator 23 and a card graphic 21 imprinted on a face of the sealed package 24. The hinge attachment 22 attaches between the card backer 31 and the sealed package 24 so that the sealed package 24 swivels relative to the card backer 31. The sealed package 24 preferably can flip up at a lower edge while being attached at an upper edge. On the face of the sealed package 24 is also preferably imprinted an amount indicator 23 to show the amount of the card and preferably also see amount of the purchase charge. A graphic decoration 21 can also be printed on a front face of the sealed package 24. The graphic decoration 21 can be a depiction of the gift card or of any other type of card. The graphic decoration 21 can also be some other type of design such as a proprietary character. The sealed package 24 is formed as a planar double sheet of thick paper or cardboard that retains within it a gift card or some other kind of stored value card.

The card backer 31 may have a pair of loops at the bottom. The pair of loops can be formed as a right loop 32 and a left loop 33. The right loop 32 may hold a right portion of a cardholder case 34. The left loop 33 may hold a left portion of a cardholder case 34. The cardholder case is preferably formed as a box having a hinge or a sliding lid to reveal a recess that can hold the stored value card retained within the sealed package 24. The cardholder case 34 can be used to present a gift card. A cashier can scan the gift card by flipping up the sealed package 24 relative to the card backer 31. The user can then remove the gift card from the sealed package and then put the gift card into the cardholder case to provide a presentation of the gift card.

Thus, the present invention includes a pair of holders for the gift card to provide a combination stored value card holder. The first holder of the gift card is the sealed package 24 and the second holder of the gift card is the cardholder case 34. The hang slot 25 can be cut into a top portion of the combination stored value card holder. The purchaser, typically the gift giver will then put the gift card in the cardholder case so that the gift giver can have a case style presentation of the gift card or stored value card.

Figure 2:
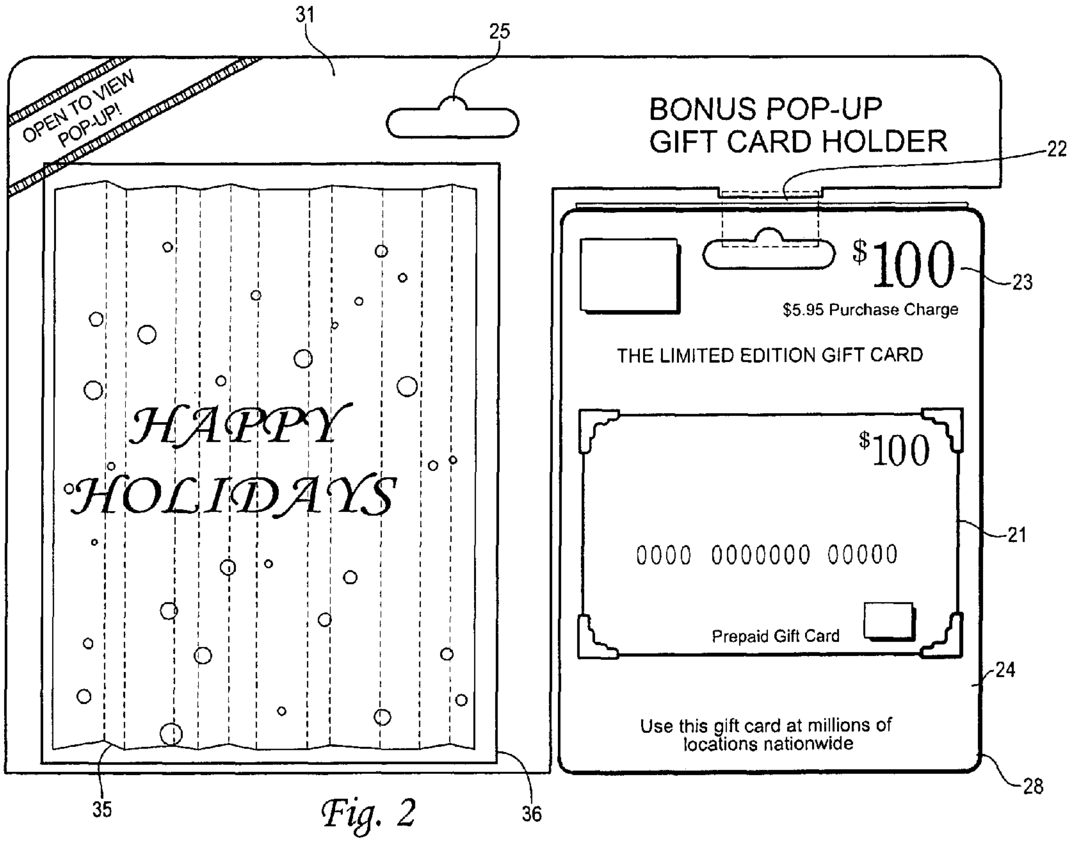
FIG. 2 is a front view of the present invention.
Figure 3:
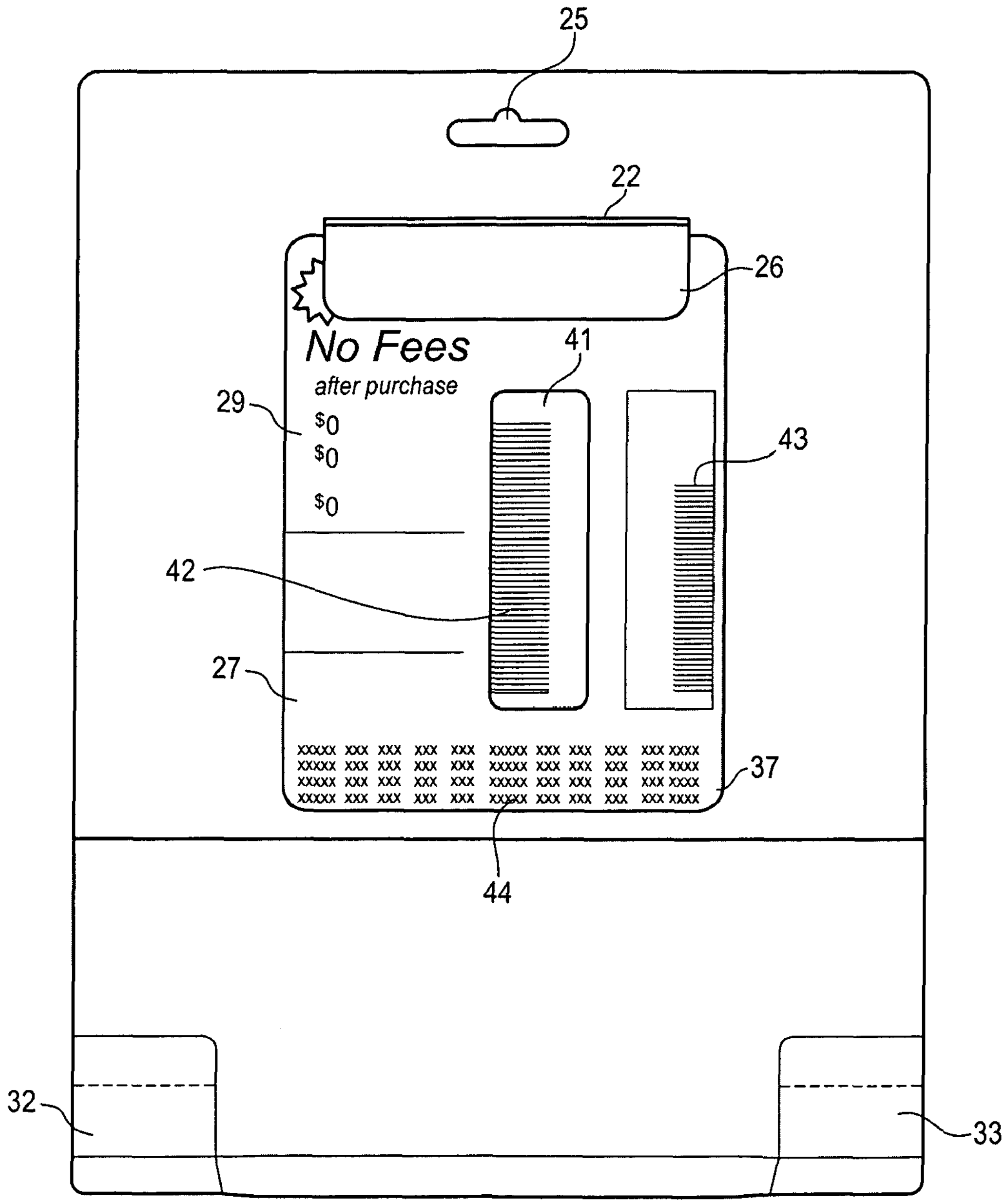
FIG. 3 is a rear view of the present invention.
Figure 4:
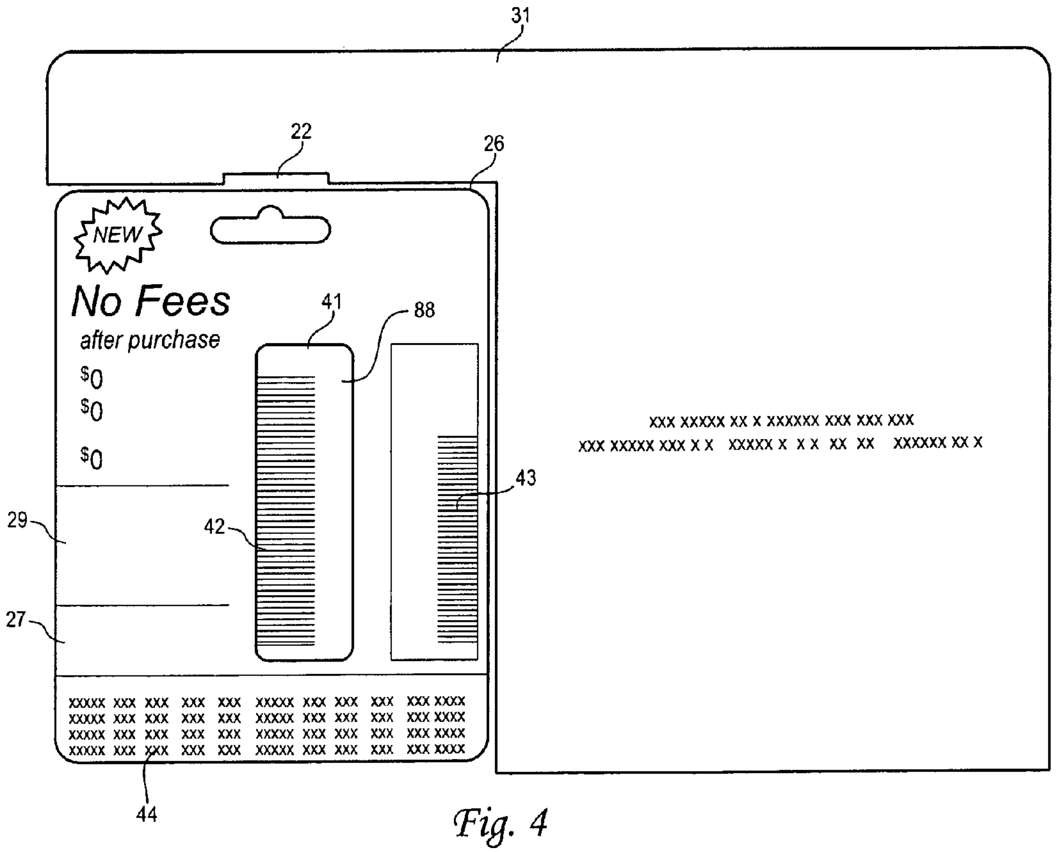
FIG. 4 is a rear view of the present invention.

The card backer may also have a greeting card 35, FIG. 2 instead of a cardholder case 34. The greeting card 35 is preferably held within the greeting card envelope 36. The greeting card envelope 36 can be clear transparent plastic, a translucent paper, or can be an opaque paper. The card backer can be connected to a sealed package 24 at a hinge attachment 22. The hinge attachment 22 can be a loop of plastic that loops between the card backer 31 and the sealed package hanging slot.

The card backer can be formed as a flat piece of cardboard having the sealed package 24 to the right, to the left, above or below a greeting card. The card backer can also be mounted to the back of the sealed package 24 in a hinged configuration, such as if the card backer of FIG. 2 where folded in half along a vertical fold line.

The card backer is made as a semi rigid cardboard or card stock sheet having a cut out to allow the sealed package 24 to hang from an upper portion of the card backer. Alternatively, the card backer can be made as a rectangular sheet of semi rigid cardboard with an opening in the back to allow viewing of the sealed package 24. The sealed package 24 is also preferably mostly rectangular in shape. The sealed package 24 is made of a similar material, namely a semi rigid cardboard or card stock sheet that sandwiches the stored value card 88 within the sealed package 24.

The card backer may have a card backer opening 37 which is slightly smaller than the sealed package 24, but large enough to display and reveal a substantial portion of the sealed package backside 27. It is preferred that more than 75% of the backside 27 of the sealed package 24 can be viewed through the card backer opening 37. In revealing a majority of the sealed package backside 27, it is preferred that account purchase information 43 is imprinted on the sealed package backside 27 and visible through the card backer opening 37. Additionally, preferably, the account information 44 such as terms and conditions or account details can be imprinted on the sealed package backside 27 and visible through the card backer opening 37. The account information 44 is preferably printed at a lower portion of the sealed package backside 27.

The card window 41 is also visible through the card backer opening 37. The card window 41 therefore constitutes a window within a window so that a viewer can view the account identifier 42 of the stored value card 88 through the card window 41. In turn, the card window 41 is viewable through the card backer opening 37 of the card backer. The hinge tab 26 is preferably rectangular and has easily releasable adhesive between the hinge tab 26 and the upper portion of the sealed package backside 27. The hinge tab 26 has a length that is equal to the length of the hinge attachment 22. The hinge attachment is hinged such as by scoring to allow rotation of the sealed package relative to the card backer.

The left loop 33 and the right loop 32 can be formed in the card backer by extending a portion of the right loop 32 or the left loop 33 above a face of the card backer. The left loop and the right loop can be formed as cutouts of the bottom corners of the card backer.

The foregoing describes the preferred embodiments of the invention. Modifications may be made without departing from the spirit and scope of the invention as set forth in the following claims. The present invention is not limited to the embodiments described above, but encompasses any and all embodiments within the scope of the following claims. For example, the housing is shown as a pair of panels each formed of a front and back sheet, but each of the front and back sheets could in turn be multilayered composites such as of a card stock and a plastic printed graphic film thermally laminated to the card stock.

The invention claimed is:

1. A combination stored value card holder comprising:

a. a card backer having a planar shape;

b. a primary stored value card container having a front side and a rear side;

c. a stored value card retained to the primary stored value card container wherein the primary stored value card container is attached to the backer;

a secondary stored value card container for the stored value card, wherein the secondary stored value card container is attached to the backer, a pair of loops, namely and left loop and a right loop, wherein the left loop and the right loop retain the secondary stored value card container to the card backer; and d. an account identifier disposed on the stored value card.

2. The stored value card holder of claim 1, further comprising: a card window disposed on the rear sheet of the sealed package, wherein the card window opening exposes the account identifier.

3. The stored value card holder of claim 1, wherein the front sheet is laminated to the rear sheet.

4. The stored value card holder of claim 1, further comprising a card backer opening formed on the card backer, wherein the card backer opening exposes the account identifier.

5. The stored value card holder of claim 1, wherein the primary stored value card container further comprises a sealed package having a front sheet and a rear sheet; wherein the stored value card is retained between the front sheet and the rear sheet of the sealed package; wherein the sealed package is attached to the card backer between the front sheet and the rear sheet of the sealed package; wherein the sealed package is attached to the backer.

6. The stored value card holder of claim 5, further comprising: a card window disposed on the rear sheet of the sealed package, wherein the card window opening exposes the account identifier.

7. The stored value card holder of claim 6, further comprising a card backer opening formed on the card backer, wherein the card backer opening exposes the account identifier.

8. The stored value card holder of claim 5, further comprising account purchase information printed on a sealed package back side.

9. The stored value card holder of claim 5, further comprising a card backer opening formed on the card backer, wherein the card backer opening exposes the account identifier.

10. The stored value card holder of claim 1, wherein the secondary stored value card container is a card storage case.

11. The stored value card holder of claim 10, further comprising: a card window disposed on the rear sheet of the sealed package, wherein the card window opening exposes the account identifier.

12. The stored value card holder of claim 10, further comprising account purchase information printed on a sealed package back side.

13. The stored value card holder of claim 10, further comprising a card backer opening formed on the card backer, wherein the card backer opening exposes the account identifier.

14. The stored value card holder of claim 13, further comprising: a card window disposed on the rear sheet of the sealed package, wherein the card window opening exposes the account identifier.

15. The stored value card holder of claim 1, wherein the secondary stored value card container is a greeting card having a stored value card retainer for holding the stored value card.

16. The stored value card holder of claim 1, further comprising: a card window disposed on the rear sheet of the sealed package, wherein the card window opening exposes the account identifier.

17. The stored value card holder of claim 1, further comprising account purchase information printed on a sealed package back side.

18. The stored value card holder of claim 1, further comprising a card backer opening formed on the card backer, wherein the card backer opening exposes the account identifier.

* * * * *